(12) United States Patent
Adams

(10) Patent No.: US 10,926,615 B2
(45) Date of Patent: Feb. 23, 2021

(54) PROTECTIVE VEHICLE ENCLOSURE

(71) Applicant: Michael Adams, Cypress, TX (US)

(72) Inventor: Michael Adams, Cypress, TX (US)

(*) Notice: Subject to any disclaimer, the term of this patent is extended or adjusted under 35 U.S.C. 154(b) by 92 days.

(21) Appl. No.: 15/968,915

(22) Filed: May 2, 2018

(65) Prior Publication Data

US 2019/0337370 A1  Nov. 7, 2019

(51) Int. Cl.
  *B60J 11/04* (2006.01)
  *B60J 11/00* (2006.01)

(52) U.S. Cl.
  CPC ..................... *B60J 11/04* (2013.01)

(58) Field of Classification Search
  CPC ............ B60J 11/04; B60J 11/00; B60J 7/1256
  See application file for complete search history.

(56) References Cited

U.S. PATENT DOCUMENTS

| | | | |
|---|---|---|---|
| 2,994,356 A | 8/1961 | Fleming | |
| 3,163,194 A * | 12/1964 | Berry | A61J 9/08 215/11.6 |
| 3,904,326 A * | 9/1975 | Clement | F04B 9/14 417/571 |
| 4,315,535 A | 2/1982 | Battle | |
| 4,612,967 A | 9/1986 | Kamen et al. | |
| 4,699,192 A | 10/1987 | Kamen et al. | |
| 5,265,292 A * | 11/1993 | Underell | A47C 4/52 297/380 |
| 5,401,074 A | 3/1995 | Timerman | |
| 5,921,389 A * | 7/1999 | Zoffer | B62J 19/00 206/335 |
| 6,253,806 B1 * | 7/2001 | Sperry | B65B 55/20 141/314 |
| 6,517,141 B1 * | 2/2003 | Su | B60J 11/00 150/166 |
| 9,499,035 B1 * | 11/2016 | Chashchukhin | B60J 11/04 |
| 9,994,097 B2 * | 6/2018 | Ching | B60J 11/04 |
| 2006/0225822 A1 | 10/2006 | Chen | |
| 2007/0284023 A1 | 12/2007 | Sitarz | |
| 2009/0008958 A1 | 1/2009 | Sebera et al. | |
| 2017/0341497 A1 | 11/2017 | Garnick | |

FOREIGN PATENT DOCUMENTS

CN   203713503   7/2014

* cited by examiner

*Primary Examiner* — Anthony D Stashick
*Assistant Examiner* — Blaine G Neway
(74) *Attorney, Agent, or Firm* — Matthews, Lawson, McCutcheon & Joseph, PLLC

(57) ABSTRACT

A sealable covering for a vehicle includes a pliable base including walls, and a plurality of panels that are either attached to the walls or attachable to the walls. The walls and panels have an inner facing side configured to face an interior of the covering, and an outer facing side configured to face away from the interior. The inner facing side includes a first pocket for containing padding material. Either the inner facing side or the outer facing side includes a second pocket for receiving a piece of protective material, and the first pocket and the second pocket overlap each other. A connector at an edge of each panel connects the plurality of panels to form, with the base, an enclosure that completely encloses and seals the vehicle within the covering. The enclosure protects the vehicle from both water damage and the impact of floating or flying debris.

20 Claims, 14 Drawing Sheets

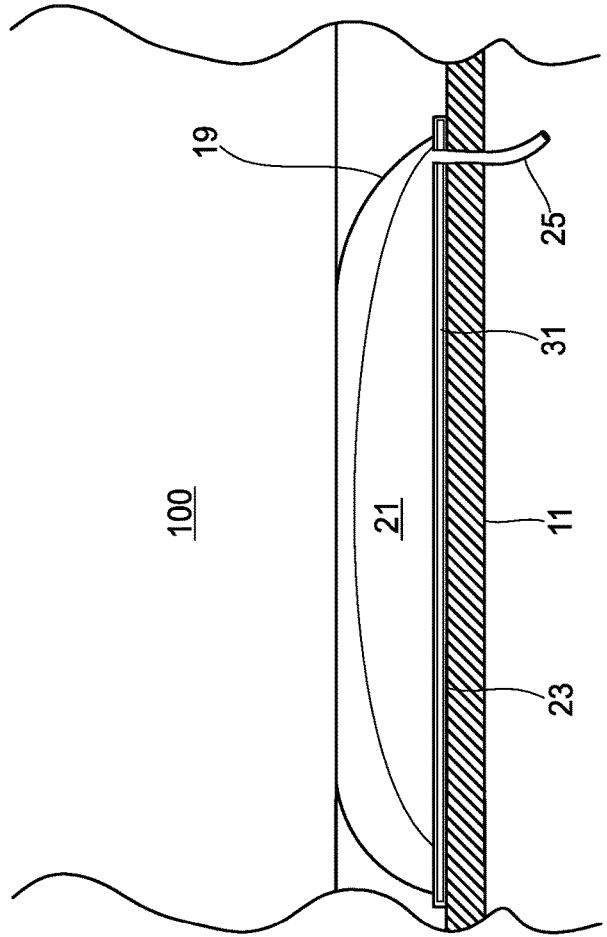
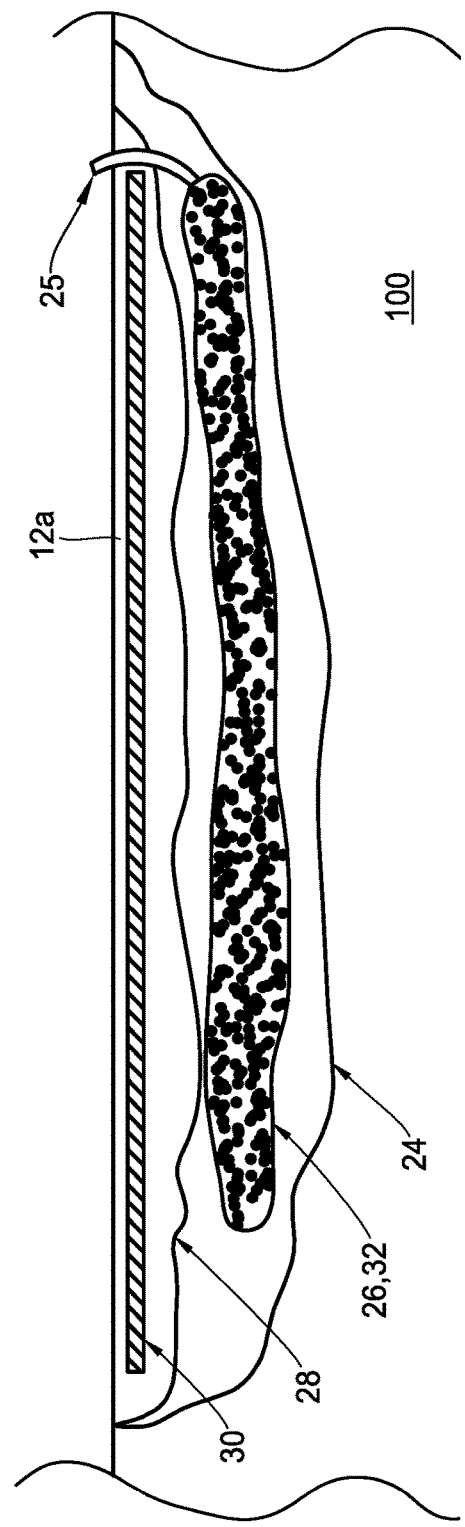

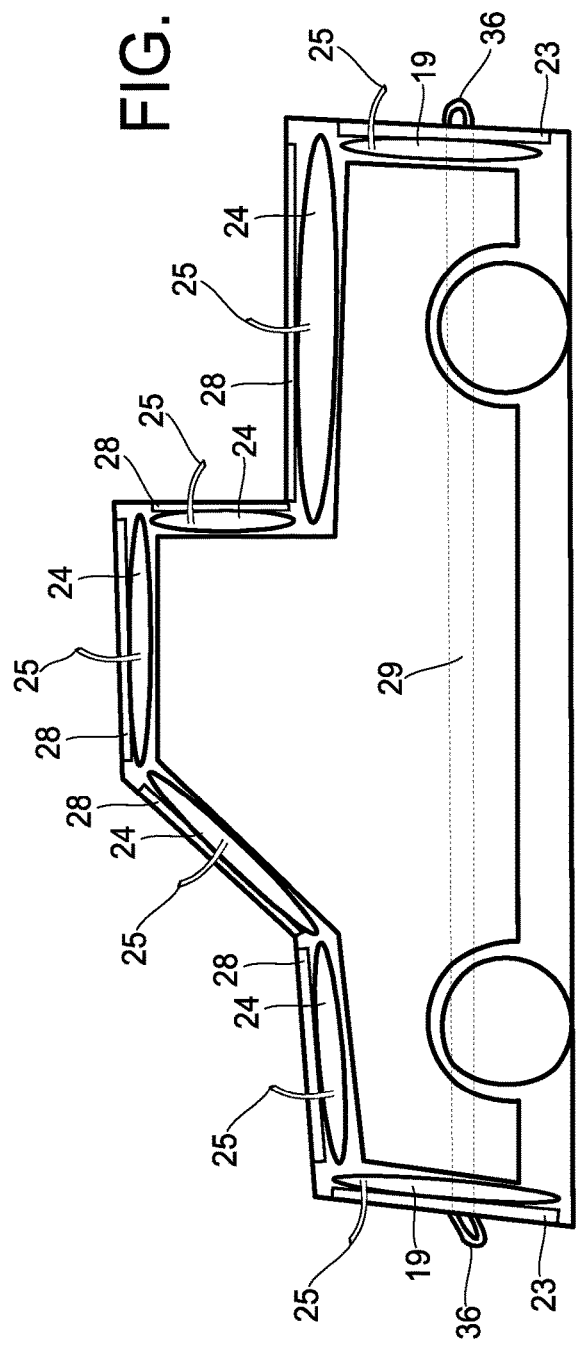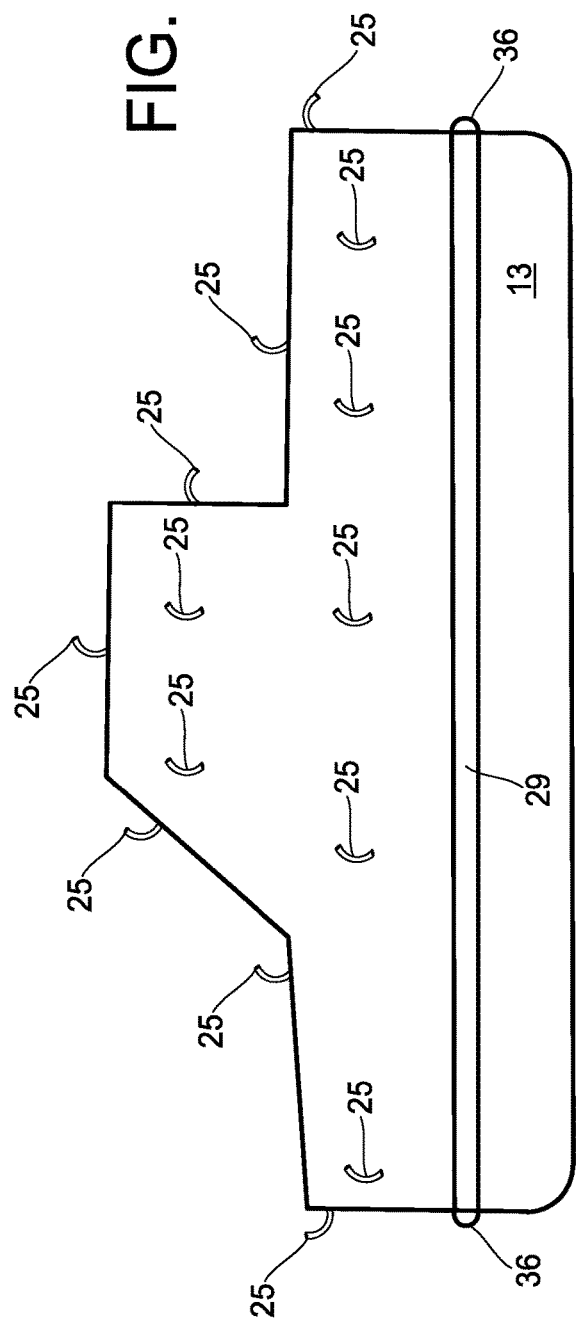

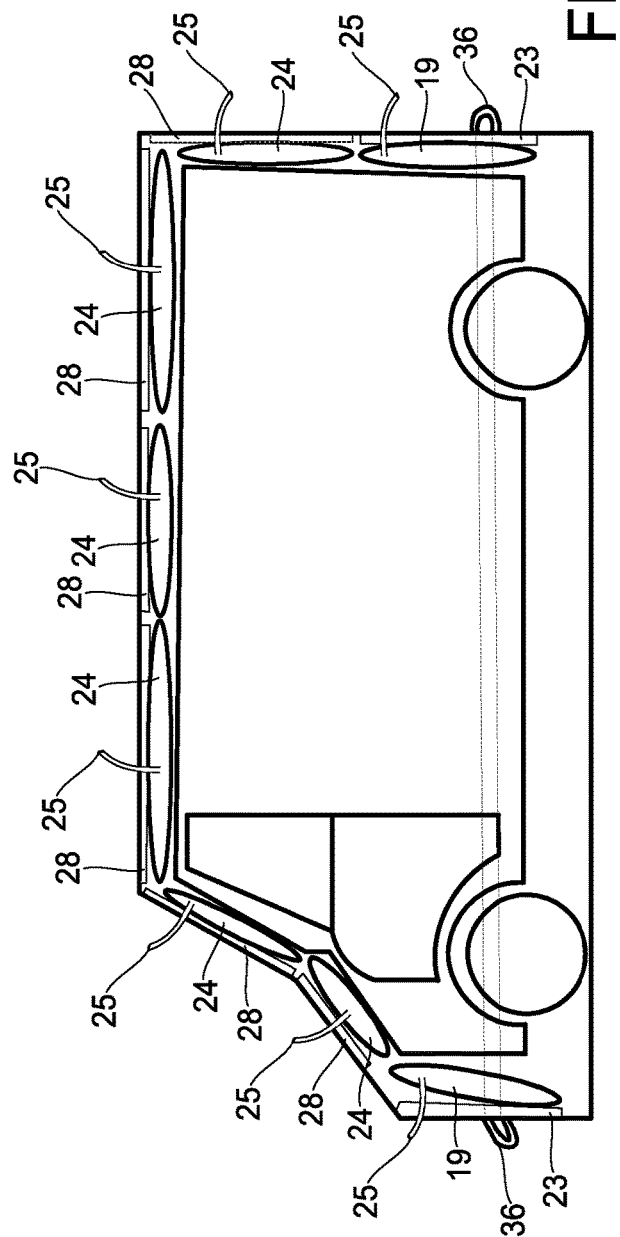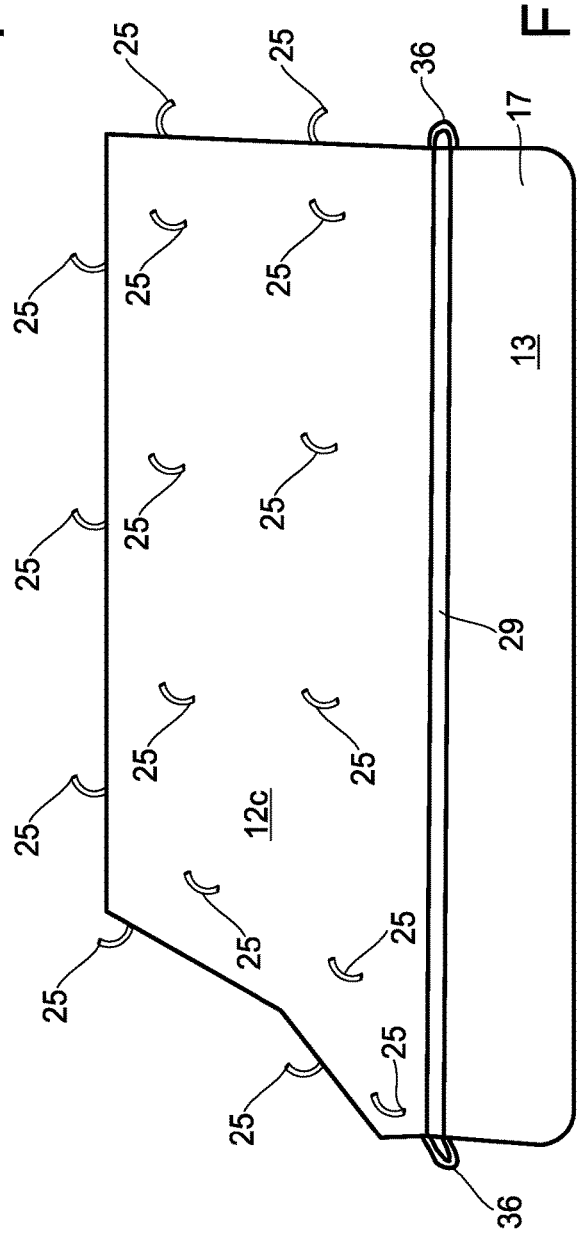

PROTECTIVE VEHICLE ENCLOSURE

TECHNICAL FIELD

The present disclosure relates to a protective vehicle enclosure. In particular, the disclosure relates to a protective vehicle enclosure that completely seals a vehicle therein from water and debris. The protective vehicle enclosure provides a padded interior and a rigid shield that protects the vehicle from the impact of floating or flying debris that may be present as a result of a natural disaster, such as a flood, a hurricane, a tornado, and hail.

BACKGROUND

Protective covers for vehicles are known. Most of those covers are designed to protect a vehicle from sun, rain, snow or ice. Some covers have protective padding on the exterior of side portions to protect the sides of a stored vehicle from dents or scuffs that may result from movement of objects adjacent the vehicle. Such covers are provided only to protect the surface of the vehicle. Other covers are designed as an envelope that seals a vehicle in a water-impermeable environment to protect the vehicle from flooding. Those covers are generally formed of a thin, flexible material having no rigidity that would protect the vehicle from the impact of physical objects.

SUMMARY

The present disclosure discusses a protective vehicle cover that provides a protective enclosure from not only flooding and other types of water damage, but also against the impact of debris that may be floating in flood waters or flying in high winds. For instance, the protective vehicle cover includes panels that are connected together via water-tight connections to provide an enclosure that completely encloses the vehicle and seals the vehicle within the covering. In addition, panels include overlapping pockets for containing padding material and protective material, respectively, which protect the exterior of the vehicle from the impact of floating or flying debris. The present disclosure is thus an improvement over the known vehicle covers discussed above.

In one embodiment, a sealable covering for enclosing a vehicle in an interior thereof comprises a pliable, liquid impermeable base including walls. The walls include an inner facing side configured to face the interior of the base, and an outer facing side configured to face away from the interior of the base. The inner facing side includes a first base pocket for containing padding material. One of the inner facing side and the outer facing side includes a second base pocket for receiving a first piece of protective material. The first base pocket and the second base pocket overlap each other. A plurality of panels that are liquid impermeable are either attached to the walls of the base or are attachable to the walls of the base. Each of the panels includes at least one edge, an inner facing side configured to face the interior of the covering, and an outer facing side configured to face away from the interior of the covering. A connector at the at least one edge of each panel connects the plurality of panels to form, with the base, an enclosure that completely encloses the vehicle and seals the vehicle within the covering. The inner facing side of the panels includes a first panel pocket for containing padding material. One of the inner facing side of the panels and the outer facing side of the panels includes a second panel pocket for receiving a second piece of protective material. The first panel pocket and the second panel pocket overlap each other. The plurality of panels includes at least a front panel, a back panel, two opposing side panels, and a top panel that is configured to be provided over a top of the vehicle when the plurality of panels are connected together. The plurality of panels together with the base form the enclosure when the plurality of panels are connected together.

In an embodiment, the inner facing side of the walls includes the second base pocket for receiving the first piece of protective material.

In an embodiment, the inner facing side of the panels includes the second panel pocket for receiving the second piece of protective material.

In an embodiment, a pane of rigid material is provided in at least one of the second base pocket and the second panel pocket.

In an embodiment, the pane of rigid material is plywood.

In an embodiment, the second panel pocket substantially matches the size and the shape of the panel having the second panel pocket.

In an embodiment, the pane of rigid material is provided in the second panel pocket, and substantially matches the size and the shape of the panel having the second panel pocket.

In an embodiment, at least one of the first base pocket and the first panel pocket is an inflatable pocket for containing a gas as the padding material.

In an embodiment, the inflatable pocket includes an air valve for inflating the inflatable pocket, the air valve extending from the inflatable pocket through the covering, so that the air valve is exposed on the outer facing side of one of the panels or on the outer facing side of one of the walls of the base.

In an embodiment, an air bladder is provided in at least one of the first base pocket and the first panel pocket.

In an embodiment, the connector is a water-tight zipper.

In an embodiment, at least one of the second base pocket and the second panel pocket is closeable to secure therein the first or second piece of protective material.

In an embodiment, the sealable covering further comprises a flotation device for floating the enclosed vehicle on water.

In an embodiment, the sealable covering further comprises an anchor for securing the enclosed vehicle to a fixed object.

In an embodiment, the sealable covering further comprises a pump for pumping liquid inside the enclosure to outside the enclosure.

In an embodiment, the sealable covering further comprises a strap on the outer facing side of the base.

In another embodiment, a method for sealing a vehicle inside an enclosure comprises placing a pliable, liquid impermeable base on a surface. The pliable base comprises walls including an inner facing side configured to face the interior of the base, and an outer facing side configured to face away from the interior of the base. The inner facing side includes a first base pocket for containing padding material. One of the inner facing side and the outer facing side includes a second base pocket for receiving a first piece of protective material. The first base pocket and the second base pocket overlap each other. A plurality of panels that are liquid impermeable are either attached to the walls of the base or attachable to the walls of the base. Each of the panels includes an inner facing side configured to face the interior of the enclosure, and an outer facing side configured to face away from the interior of the enclosure. The inner facing side of the panels includes a first panel pocket for containing padding material. One of the inner facing side and the outer facing side of the panels includes a second panel pocket for receiving a second piece of protective material. The first panel pocket and the second pocket overlap each other. The method further includes moving the vehicle onto the pliable base; adding padding material to the at least one first base pocket; inserting a piece of protective material into the at least one second base pocket; adding padding material to the first panel pocket of at least one of a front panel, a back panel, two opposing side panels, and a top panel of the plurality of panels; inserting a piece of protective material into the second panel pocket of at least one of the front panel, the back panel, the two opposing side panels, and the top panel of the plurality of panels; and connecting edges of the panels to form the enclosure with the base and completely enclose the vehicle and seal the vehicle within the enclosure.

In the method, at least one of the first base pocket and the first panel pocket may be an inflatable pocket for containing a gas as the padding material, and the method may include inflating the at least one of the first base pocket and the first panel pocket.

In the method, the inflatable pocket may include an air valve for inflating the inflatable pocket, and the air valve may extend from the inflatable pocket through the enclosure, so that the air valve is exposed on the outer facing side of one of the panels or on the outer facing side of one of the walls of the base. The method may include inflating the at least one of the first base pocket and the first panel pocket via the air valve.

In the method, at least one of the second base pocket and the second panel pocket may be closeable, and the method may include closing the at least one of the second base pocket and the second panel pocket to secure therein the first or second piece of protective material.

BRIEF DESCRIPTION OF THE FIGURES

Various embodiments are hereafter described in detail and with reference to the drawings wherein like reference characters designate like or similar elements throughout the several figures and views that collectively comprise the drawings.

FIGS. 6A and 6B show cross-sectional views of the first and second base and panel pockets according to an embodiment.

FIGS. 11-13 illustrate an embodiment of a covering 10 for a pick-up.

FIGS. 14-16 illustrate an embodiment of a covering 10 for a van.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

It should also be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
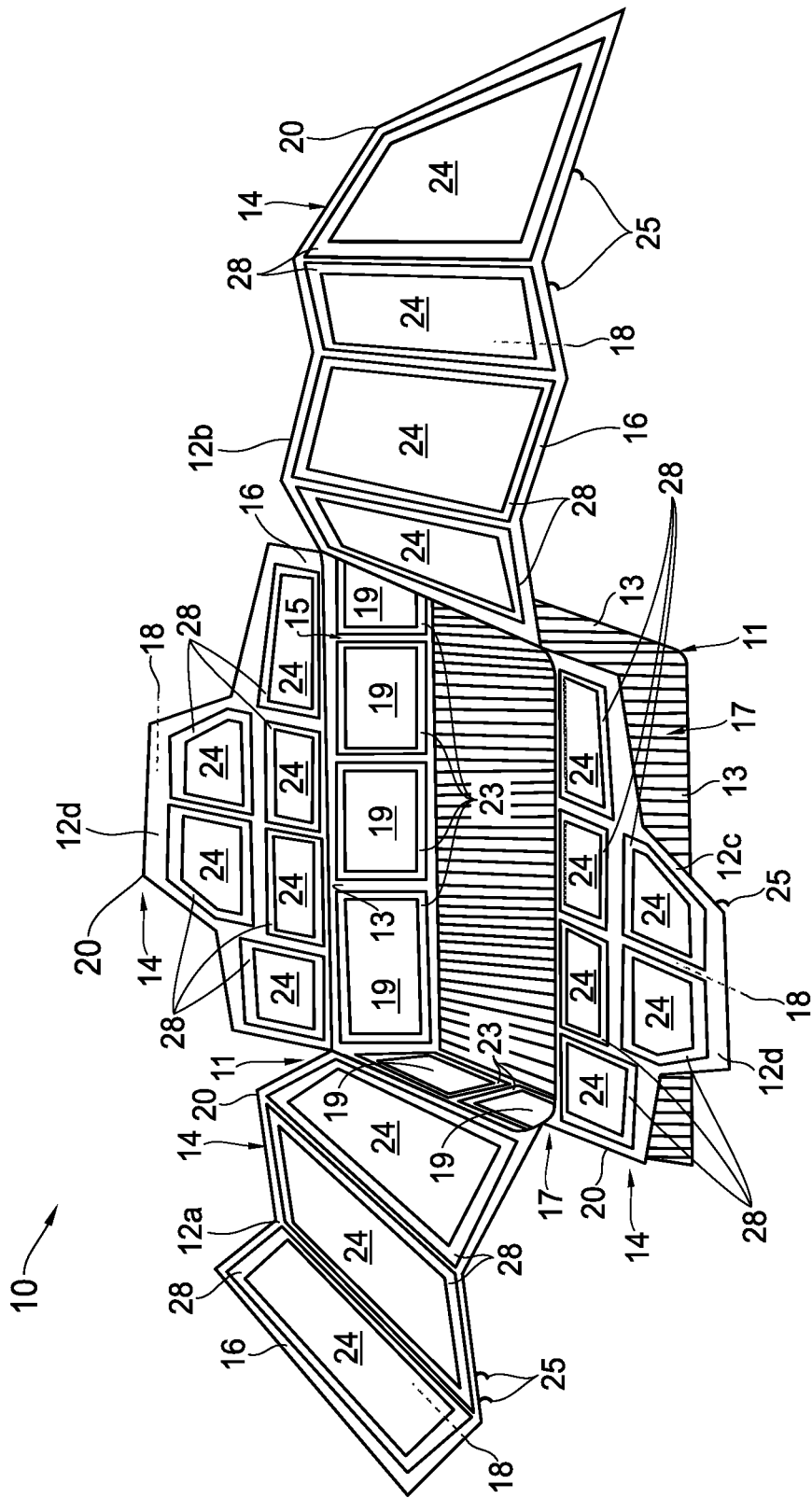
FIG. 1 is a perspective view of a covering for enclosing a vehicle, according to one embodiment.
Figure 2:
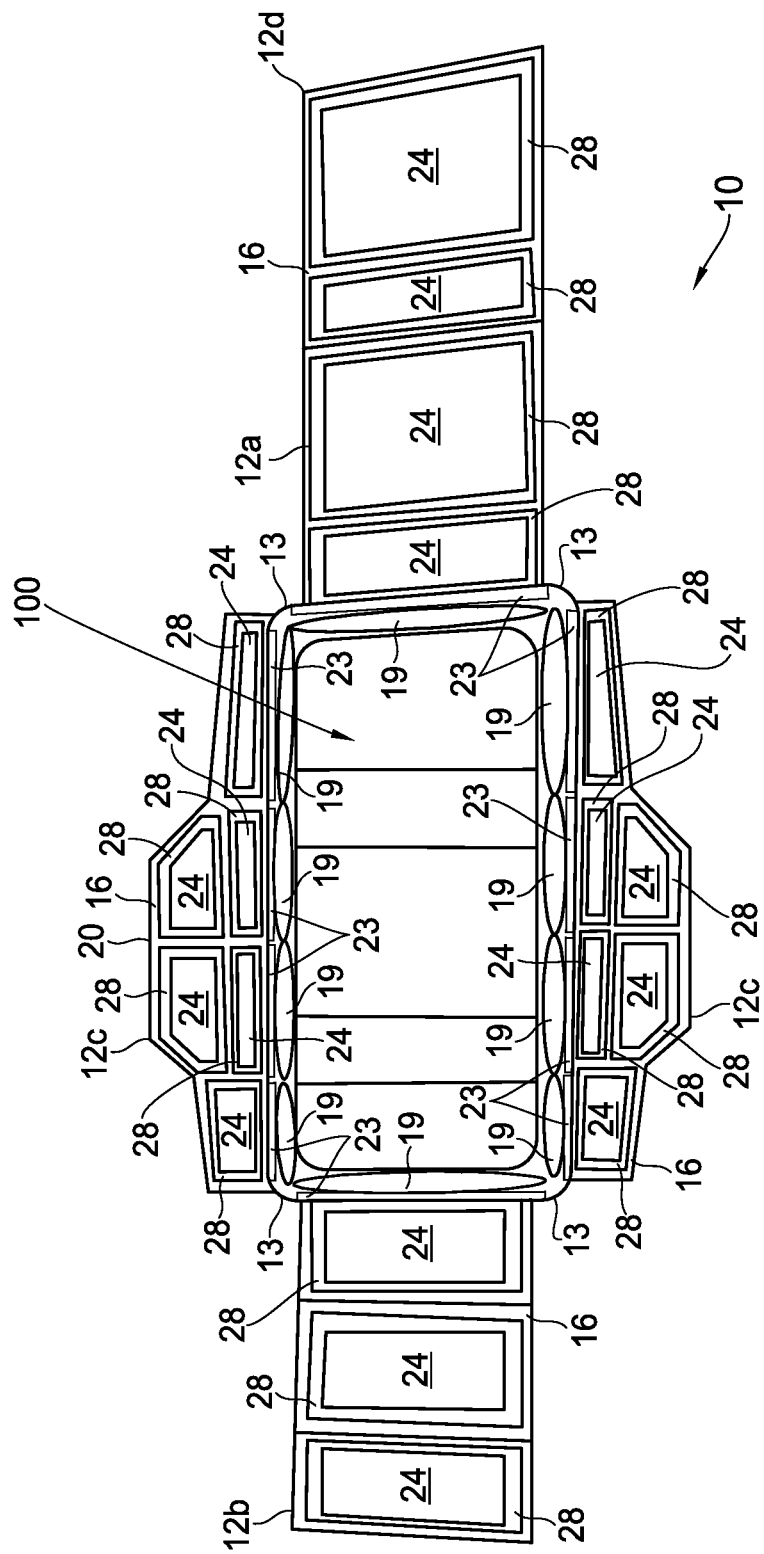
FIG. 2 is a plan view of the covering for enclosing a vehicle, according to the embodiment.
Figure 3:
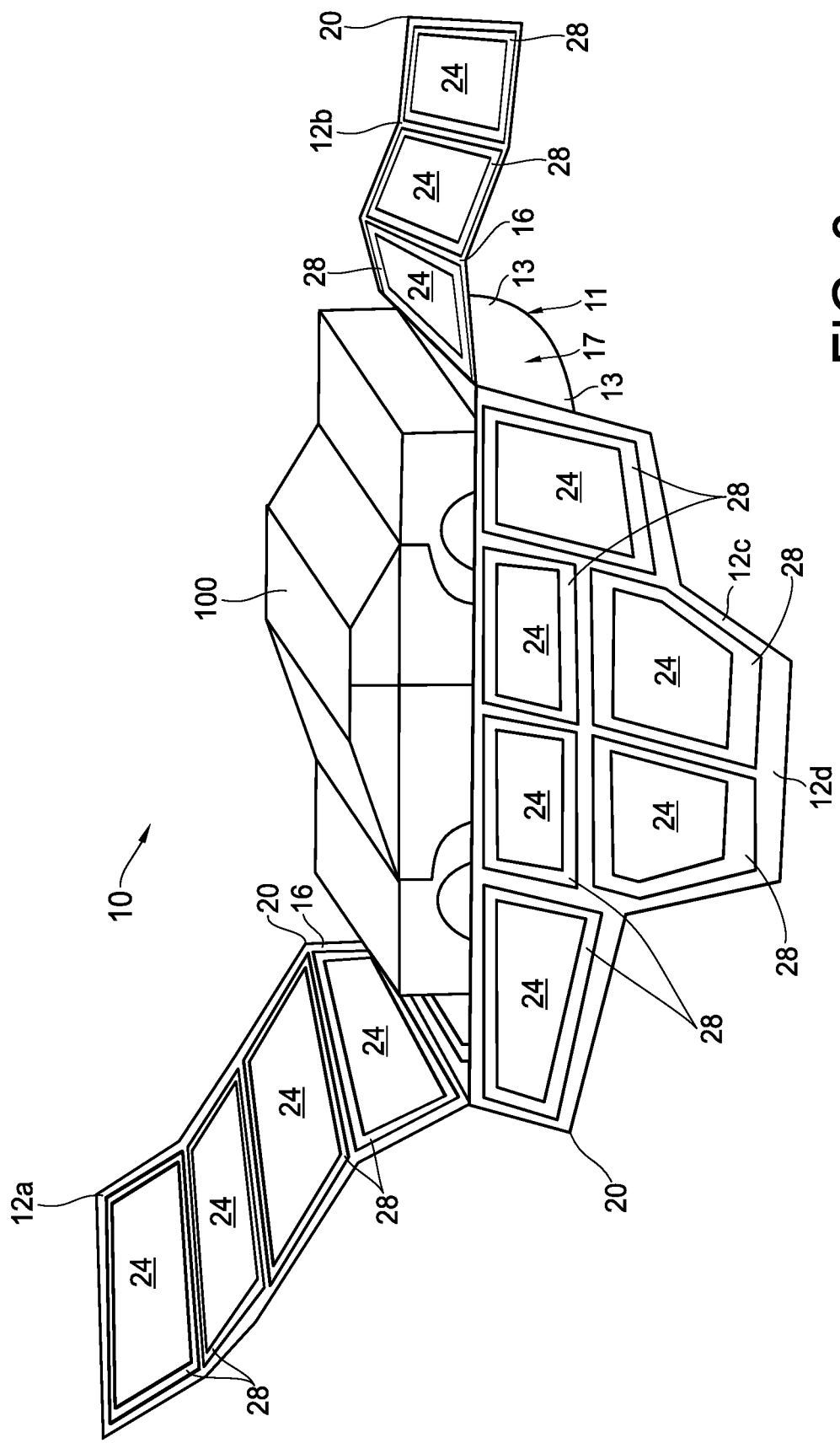
FIG. 3 is a perspective view of the covering partially enclosing a vehicle, according to the embodiment.

FIGS. 1-10 illustrate an embodiment of a covering 10 for enclosing a vehicle 100 that is a sedan. FIG. 1 shows a perspective view of the covering 10. In this embodiment, the covering 10 is for a sedan. FIG. 2 shows the same covering 10 in plan view. The covering 10 may be formed of essentially two components-a base 11 and a plurality of panels 12a-12d. The base 11 may be formed of a liquid impermeable material to prevent the intrusion of water or other liquids into the covering 10. Some examples of suitable material for the base 11 include rubber, synthetic rubber, vinyl, closed cell foam polypropylene, nitrile, and polyvinyl chloride (PVC). The material may afford the base 11 with durability and strength able to withstand up to 40,000 N of force against corners of the base 11. The thickness of the base 11 may range from 5 mm to 50 mm, preferably from 10 mm to 30 mm, and more preferably from 10 mm to 20 mm. The thickness should allow the base 11 to have durability and strength while at the same time being pliable and resilient enough to maintain its form, even after a vehicle 100 rolls over a portion of the base 11 to fit in the base 11, as shown in FIG. 3, during the process of enclosing the vehicle 100 (discussed in further detail below).

Figure 4:
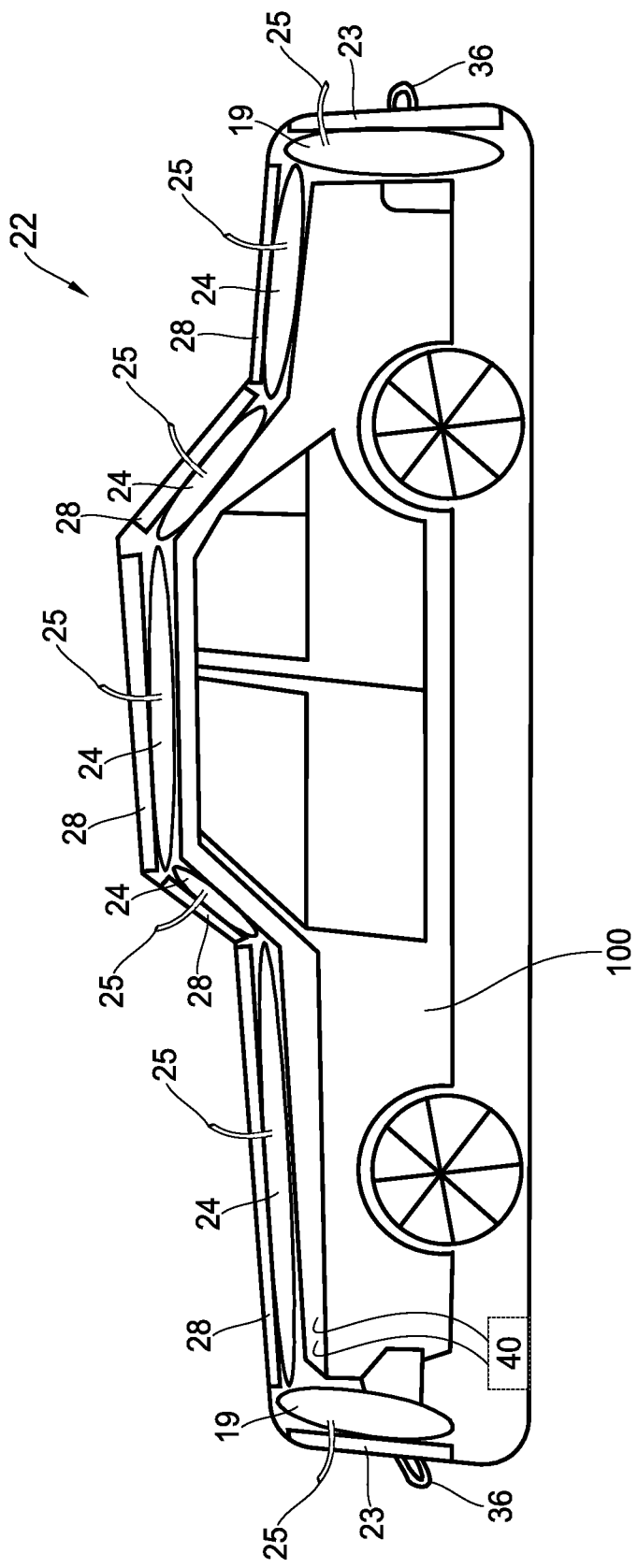
FIG. 4 is a side cross-section of the covering fully enclosing a vehicle, according to the embodiment.
Figure 5:
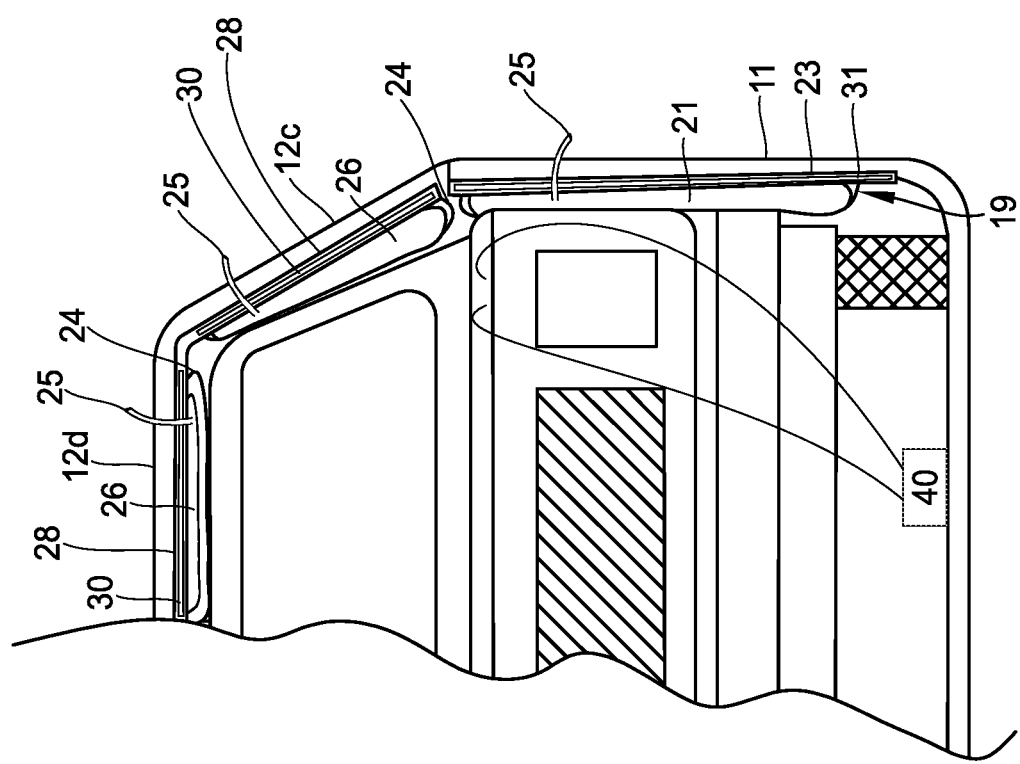
FIG. 5 is a partial front cross-section of the covering fully enclosing a vehicle, according to an embodiment.

The base 11 includes several walls 13 that enclose the first two to three feet of the vehicle 100 when the vehicle 100 is inside the base 11, as shown in FIG. 3. In the embodiment, the walls 13 form one unitary piece with the bottom of the base 11. That is, the base 11 and walls 13 form a single unitary element. This configuration helps maintain the structural integrity of the base 11 and walls 13 as a whole. The walls 13 include an inner facing side 15 configured to face the interior of the base 11, and an outer facing side 17 configured to face away from the interior of the base 11. The inner facing side 15 includes one or more first base pockets 19. The first base pockets 19 are designed to contain a padding material 21, discussed in further detail below with respect to FIGS. 4-7. In the illustrated embodiment, the inner facing side 15 also includes one or more second base pockets 23 that are each provided between a respective first base pocket 19 and the wall 13, so that every first base pocket 19 overlaps one of the second base pockets 23, as shown in FIG. 1. The second base pockets 23 are each configured to receive a first piece of protective material 31, as discussed in further detail below with respect to FIGS. 4-7. As an alternative, one or more of the second base pockets 23 may be located on the outer facing side 17 of the wall 13. In either embodiment, each first base pocket 19 is provided to be between one of the second base pockets 23 and the vehicle 100 inside the covering 10 in order to provide the padding material 21 against the vehicle 100. For instance, FIG. 4 shows a side cross-section of the covering 10 fully enclosing the vehicle 100. FIG. 4 illustrates that the first base pockets 19 are each provided to be between one of the second base pockets 23 and the vehicle 100 inside the covering 10. FIG. 5 is a partial front cross-section of the covering 100 fully enclosing the vehicle 100. FIG. 5 shows a first base pocket 19 containing a padding material 21, and that the first base pocket 19 and padding material 21 are provided between a second base pocket 23 that contains a first piece of protective material 31. In this configuration, the secondary force resulting from an initial impact against the protective material 31 in the second base pocket 23 is absorbed by the padding material 21 in the first base pocket 19 instead of by the vehicle 100.

The plurality of panels 12a-12d are also liquid impermeable. The panels 12a-12d may formed of a material that is the same or different than the material of the base 11. Some examples of suitable material for the panels 12a-12d include rubber, rubber impregnated with nylon, Kevlar, Nomex, Technora, other aramids, and aramid-like fibers, Denier, coated Ballistic Nylon fabric, and carbon fiber. The panels 12a-12d may be fixedly attached to ends of the walls 13 of the base 11 by heavy stitching or other permanent means. Alternatively, the panels 12a-12d may be attachable to the walls 13 of the base 11 via a connector, such as a heavy duty water-tight zipper. In either embodiment, free edges 14 of the panels 12a-12d include a connector 20 for connecting the plurality of panels 12a-12d to form, with the base 11, an enclosure 22 (see FIGS. 4, 9 and 10) that completely encloses the vehicle 100 and seals the vehicle 100 within the covering 10. The connector 20 may be a heavy duty water-tight zipper.

Figure 7:
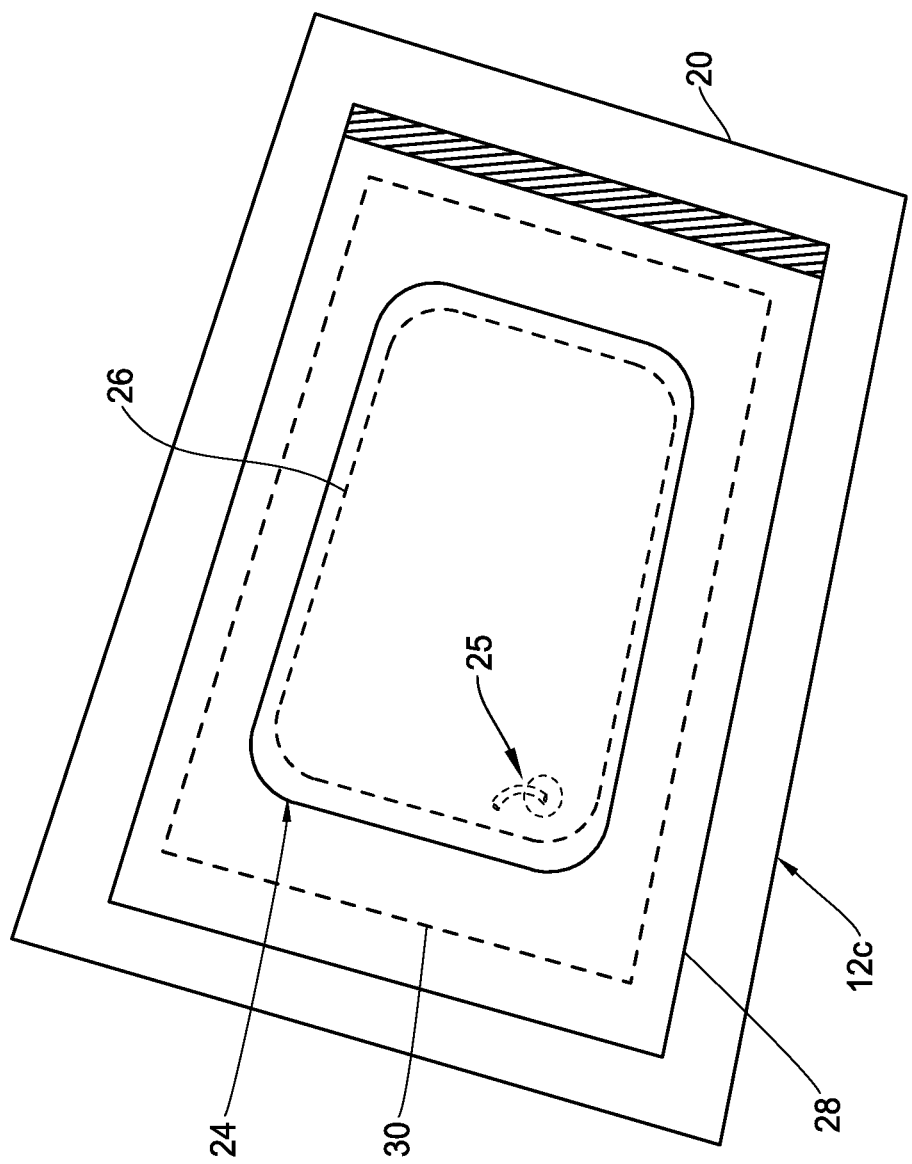
FIG. 7 is a front view of a panel having the first and second pockets according to an embodiment.

The panels 12a-12d include an inner facing side 16 configured to face the interior of the covering 10, and an outer facing side 18 configured to face away from the interior of the covering 10. The inner facing side 16 of the panels 12a-12d includes at least one first panel pocket 24 for containing padding material 26 as shown in FIGS. 5-7. In the illustrated embodiment, the inner facing side 16 also includes at least one second panel pocket 28 that is provided between one of the first panel pockets 24 and the panel 12, so that every first panel pocket 24 overlaps one of the second panel pockets 28, as shown in FIG. 1. The second panel pockets 28 are configured to receive a second piece of protective material 30 (see FIGS. 5-7). As an alternative, the second panel pockets 28 may be located on the outer facing side 18 of the panel 12. In either embodiment, each first panel pocket 24 is provided to be between one of the second panel pockets 28 and the vehicle 100, as shown in the drawings) in order to provide the padding material 26 against the vehicle 100. As discussed above, FIG. 4 illustrates that the first panel pockets 24 are each provided to be between one of the second panel pockets 28 and the vehicle 100 inside the covering 10. FIG. 5 shows a first panel pocket 24 containing a padding material 26, and that the first panel pocket 24 and padding material 26 are provided between a second panel pocket 28 that contains a second piece of protective material 30. In this configuration, the secondary force resulting from an initial impact against the protective material 30 in the second panel pocket 28 is absorbed by the padding material 26 in the first panel pocket 24 instead of by the vehicle 100.

FIG. 6A shows a cross-sectional view of the relationship of the first base pocket 19 and the second base pocket 23, the first base pocket 19 having a padding material 21, and the second base pocket 23 having a first piece of protective material 31. The padding material 21 between the vehicle 100 and the protective material 31 protects the vehicle 100 in the covering 10 from a force impacting the protective material 31. Similarly, FIG. 6B illustrates a cross-sectional view of the relationship of the first panel pocket 24 and the second panel pocket 28, the first panel pocket 24 having a padding material 26, and the second panel pocket 28 having a second piece of protective material 30. The padding material 26 between the vehicle 100 and the protective material 30 protects the vehicle 100 in the covering 10 from a force impacting the protective material 30. In an embodiment discussed in detail below, the first base pockets 19 and the first panel pockets 24 may each include an air valve 25.

Figure 8:
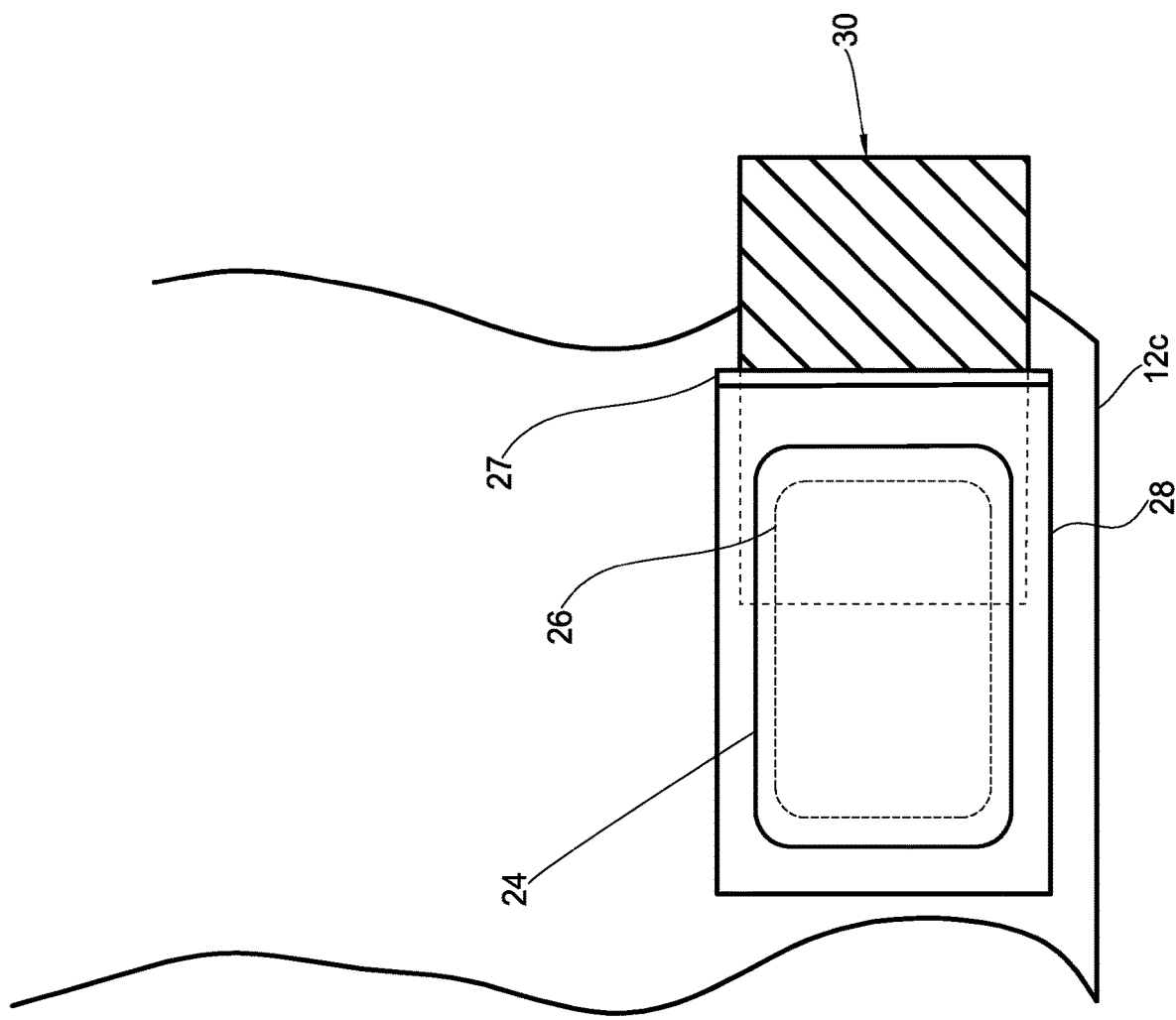
FIG. 8 is a view showing insertion a pane of rigid material into a pocket according to an embodiment.

FIG. 7 is a front view a panel 12c having a first panel pocket 24 and a second panel pocket 28 according to an embodiment, and FIG. 8 is a view showing insertion a pane of rigid material 30 into the second panel pocket 28. The padding material 26 inside the first panel pocket 24 is shown with broken lines because it is hidden inside the first panel pocket 24. Likewise, the piece of protective material 30 inside the second panel pocket 28 is shown with broken lines because it is hidden inside the second panel pocket 28. While not shown, a similar configuration may be had by the first base pocket 19 and the second base pocket 23. Although the first panel pocket 24 is shown to be smaller than the second panel pocket 28, such a configuration is only one example. The first panel pocket 24 may be larger than the second panel pocket 28, or may be the same size as the second panel pocket 28. The same is true for the protective material 30 and the padding material 26. Although the padding material 26 is shown to be smaller than the protective material 30, the padding material 26 may be larger than the protective material 30, or may be the same size as the protective material 30. In some embodiments, the second base pocket 23 and/or the second panel pocket 28 may be closeable in order to secure therein the first piece of protective material 30 or second piece of protective material 31. For instance, a hook and loop connector 27 may be provided at the opening of the second base pocket 23 and/or the second panel pocket 28, as shown in FIGS. 7 and 8. Once the piece of protective material 30 is fully inserted into the second panel pocket 28, the opening may be closed by the hook and loop connector 27. Other devices for closing the second base pocket 23 and/or the second panel pocket 28 may be a water-tight zipper. Further, the opening of the second base pocket 23 and/or the second panel pocket 28 may be provided on a side of the pocket, so that the piece of protective material 31 is received into the pocket horizontally rather than vertically. Having the opening on the side of the pocket may help eliminate stress on the opening that may be caused by buoyancy of the piece of protective material when the enclosure 22 having the vehicle 100 is surrounded by water.

Figure 9:
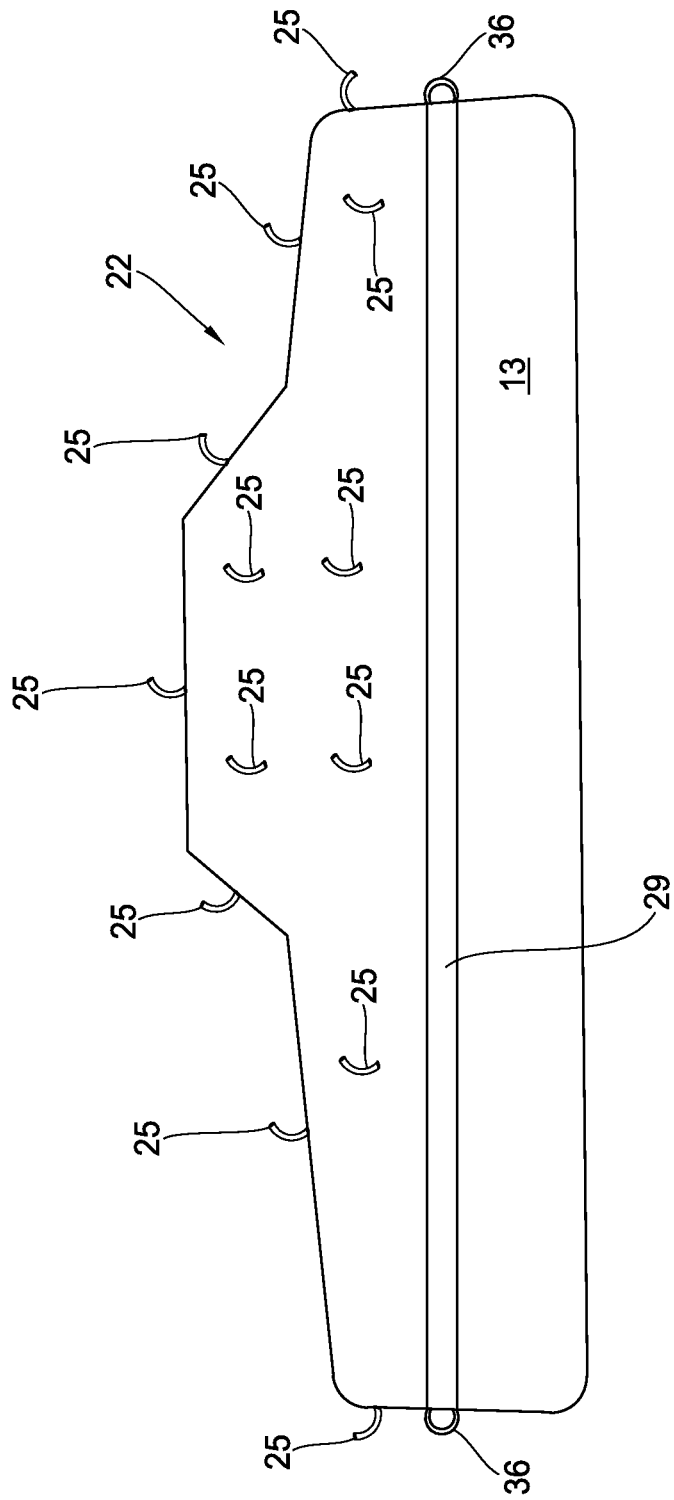
FIG. 9 is a side view of an enclosure sealing a vehicle therein.
Figure 10:
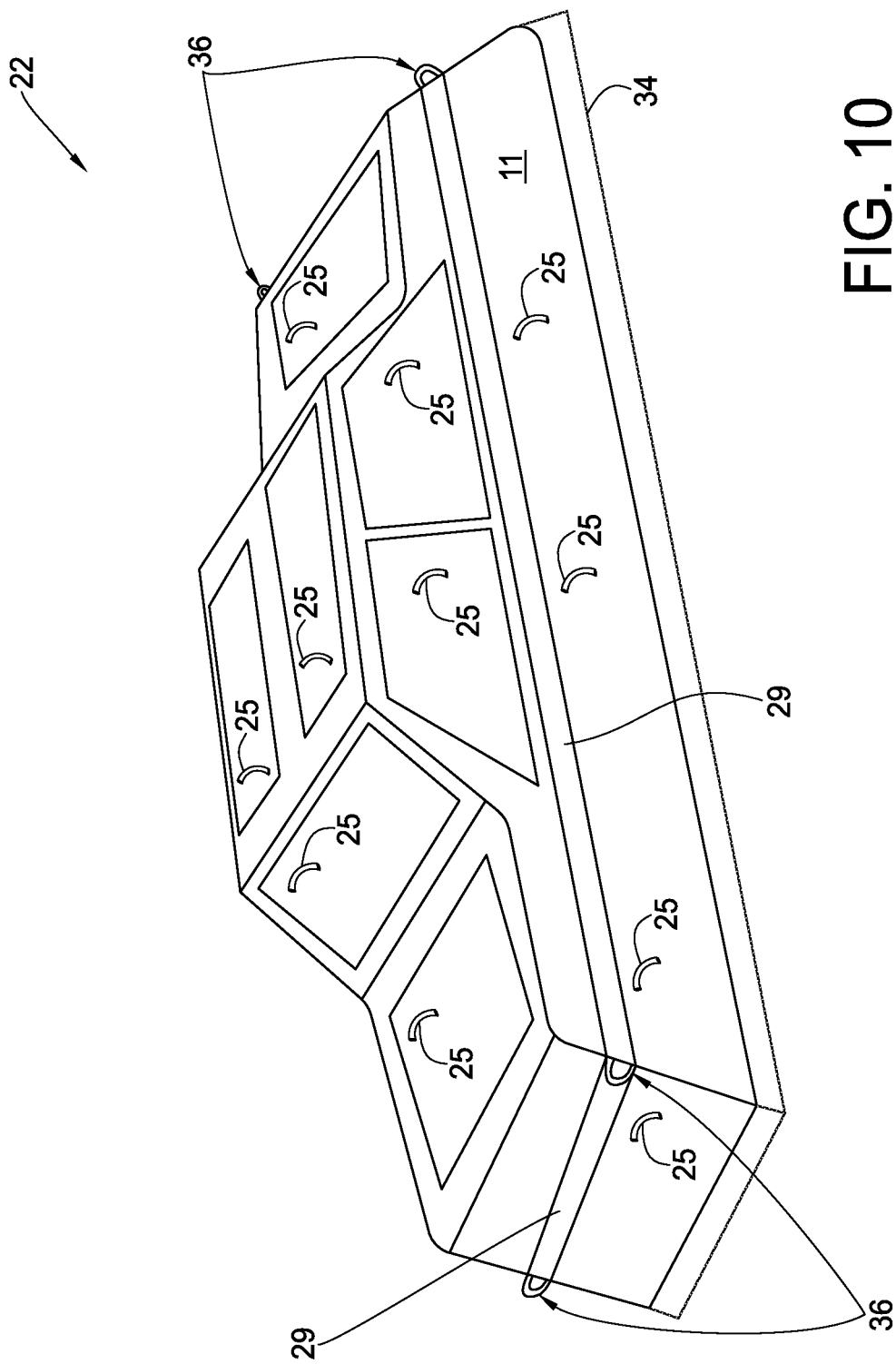
FIG. 10 is a perspective view of an enclosure sealing a vehicle therein.

As shown in FIG. 1, the plurality of panels 12a-12d includes at least a front panel 12a, a back panel 12b, two opposing side panels 12c, and a top panel 12d that is configured to be provided over a top of the vehicle 100 when the plurality of panels 12a-12d are connected together. Once connected together, the plurality of panels 12a-12d together with the base 11 form the enclosure 22 that completely encloses and seals the vehicle 100 as shown in FIGS. 4, 9 and 10. FIG. 9 shows a side view of the enclosed vehicle 100, and FIG. 10 shows a perspective view of the enclosed vehicle 100.

Additional panels 12 may be included depending on the size, type, make and model of the vehicle 100 to be enclosed. In the illustrated embodiments shown in FIGS. 1-10, the vehicle 100 is a sedan. However, the covering 10 may include an appropriate number of panels 12a-12d to accommodate vans, mini-vans, trucks, pick-up trucks, sports cars, economy cars, buses, and limousines. For instance, FIGS. 11-13 illustrate an embodiment of a covering 10 for a pick-up truck, and FIGS. 14-16 illustrate an embodiment of a covering 10 for a van.

Figure 11:
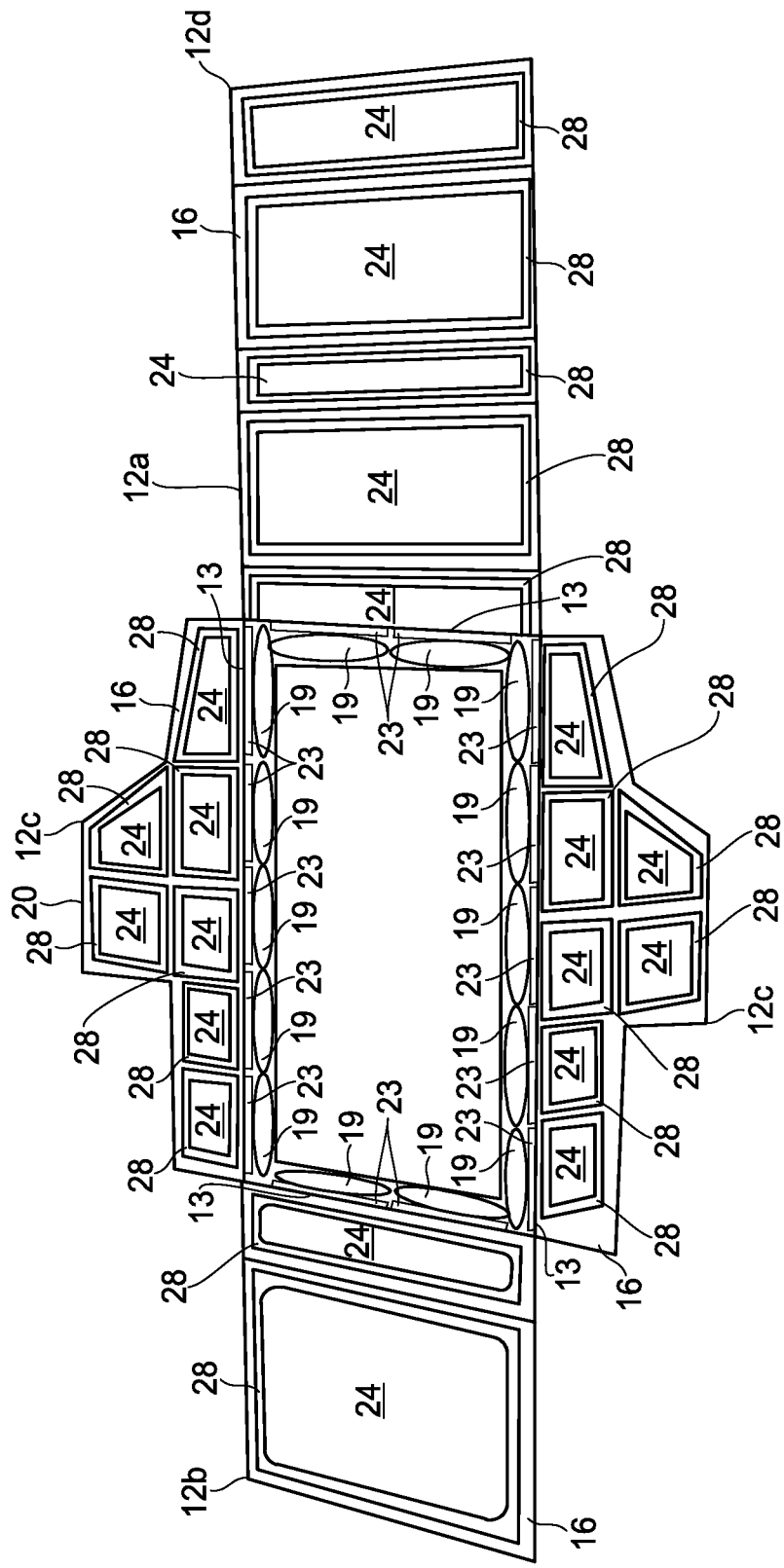

FIG. 11 illustrates a plan view of a covering 10 for a pick-up truck. FIG. 12 illustrates a cross-sectional view of the covering 10 enclosing a pick-up truck, and FIG. 13 illustrates a side view of the pick-up truck enclosed by the covering 10. The covering 10 for the pick-up truck embodiment shown in FIGS. 11-13 includes at least a front panel 12a, a back panel 12b, two opposing side panels 12c, and a top panel 12d, as in the embodiments discussed above. The plurality of panels 12 in this covering 10 may be shaped differently than the covering 10 for the sedan in the previous embodiments in order to accommodate the different shape of the pick-up truck. The reference numbers used in FIGS. 11-13 that are the same as the ones used in FIGS. 1-10 indicate like components.

Figure 14:
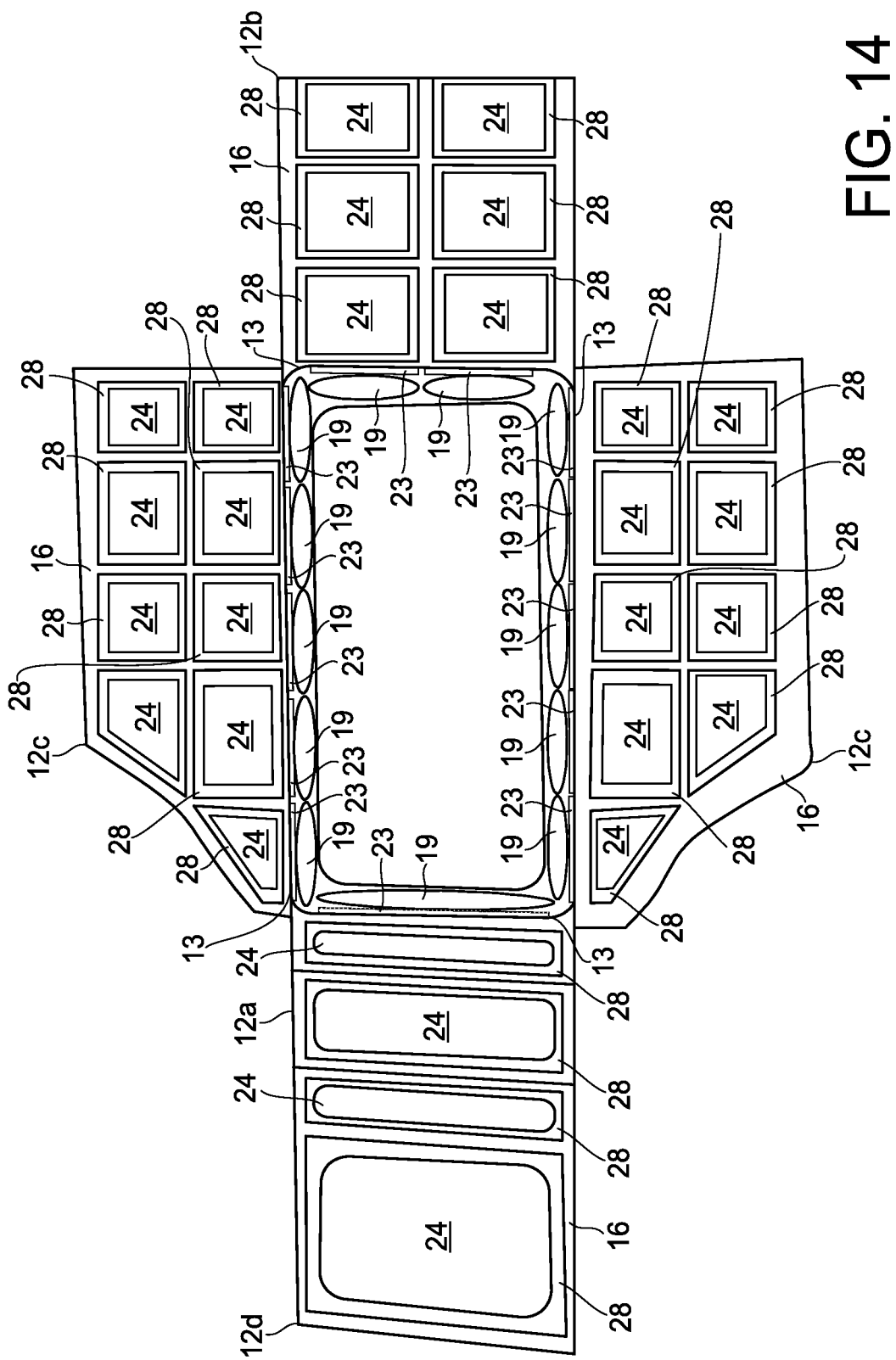

FIG. 14 illustrates a plan view of a covering 10 for a van. FIG. 15 illustrates a cross-sectional view of the covering 10 enclosing a van, and FIG. 16 illustrates a side view of the van enclosed by the covering 10. The covering 10 for the van embodiment shown in FIGS. 14-16 includes at least a front panel 12a, a back panel 12b, two opposing side panels 12c, and a top panel 12d, as in the embodiments discussed above. The plurality of panels 12 in this covering 10 may be shaped differently than the covering 10 for the sedan and the pick-up truck in the previous embodiments in order to accommodate the different shape of the van. The reference numbers used in FIGS. 14-16 that are the same as the ones used in FIGS. 1-10 indicate like components.

The first piece of protective material 30 and/or the second piece of protective material 31 may be a pane of rigid material. For instance, the pane of rigid material may be plywood. In other embodiments, the pane of rigid material may be plastic, fiberglass, aluminum, carbon fiber, bamboo or other material that provides a rigid characteristic to the pane. In all of the embodiments, a pane of rigid material is provided in the second base pocket 23 and in the second panel pocket 28. The second panel pocket 28 may substantially match the size and the shape of the panel 12 having the second panel pocket 28. Further, the pane of rigid material 30 may substantially match the size and the shape of the panel 12 having the second panel pocket 28. In other embodiments, multiple smaller panes of rigid material may be inserted into a single pocket in order to match the shape of the pocket.

In a preferred embodiment, the first base pocket 19 and the first panel pocket 24 are inflatable pockets for containing a gas, such as air, as the padding material. Other types of gases may be used, such as carbon dioxide, nitrogen, helium. The inflatable pockets 19, 24 may each include an air valve 25 for inflating the inflatable pocket 19, 24. The air valve 25 may extend from the inflatable pocket 19, 24 through the covering 10, so that the air valve 25 is exposed on the outer facing side 18 of one of the panels 12 or on the outer facing side 17 of one of the walls 13 of the base 11. In some embodiments, the air valve 25 may penetrate the second panel pocket 28, such that the second panel pocket 28 includes an opening to accommodate the air valve therethrough. In such a case, the pane of rigid material 30 would also be provided with a corresponding opening through which the air valve 25 passes. The gases used to fill the inflatable pocket 19, 24 may be provided in a compressed form, such as in a cartridge that quickly releases the compressed gas into the inflatable pocket 19, 24 via the air valve 25.

In a different embodiment, the first base pocket 19 and the first panel pocket 24 may be pockets adapted to receive a separate air bladder 32. The air bladder 32 may be a separately inflatable unit this inflated before insertion into the first base pocket 19 or the first panel pocket 24. In some cases, the air bladder 32 may have a plurality of cells that are inflatable. In another embodiment, the first base pocket 19 and the first panel pocket 24 may be pockets adapted to receive a cushion or pillow as the padding material.

In further embodiments, the covering 10 may include a flotation device 34, as shown in FIG. 10, for floating the enclosed vehicle 100 on water. The flotation device may be composed of additional air bladders on at the bottom or sides of the base 1. Owing to the fact that the fully enclosed vehicle constitutes a water-tight environment holding air, the entire package (i.e., the vehicle-enclosed covering) may become buoyant. This characteristic may help the flotation device 34 keep the enclosed vehicle 100 afloat.

In further embodiments, the covering 10 may include one or more anchors 36 for securing the enclosed vehicle 100 to a fixed object 38. The anchors 36 may be provided on the outer facing side 17 of a wall 13 of the base 11. The anchors 36 may be formed of steel, Kevlar, nylon, titanium, or strong metal alloy. The anchors 36 may be used to secure the enclosure 22 having the vehicle 100 to a stationary structure, such as a light post or tree, to prevent the enclosure from floating away during a flood or blowing away during a tornado.

In further embodiments, the covering 10 may include a pump 40 for pumping out of the enclosure 22 liquid that may have seeped inside the enclosure 22. The pump 40 may be provided inside the enclosure 22 on a portion of the base 11 and may be battery powered. In one embodiment, the pump 40 is electrically connected via wires to the battery of the vehicle 100. The base 11 may be provided with a float device that turns the pump 40 on when it detects a pre-determined water level in the enclosure 22.

In further embodiments, the covering 10 may include a strap 29 on the outer facing side 17 of the walls 13 of the base 11. The strap 29 is preferably located around the covering 10 so as to be located at a level of the bumper of the vehicle 100 that is enclosed by the covering 10. Having the strap 29 at this location may help evenly distribute the tensile forces from wind and/or rushing water that may act on the covering 10 during a natural disaster. The strap 29 may be formed of a nylon material, and may be provided on a portion of the base 11 or may completely surround the base 11. The strap 29 may be used to drag or maneuver the enclosure 22 having the vehicle 100 should the enclosure 22 be floating in water. In a preferred embodiment, the anchors 36 are attached to the strap 29, such as by sewing, The present disclosure also is directed to a method for sealing a vehicle 100 inside an enclosure 22. The method involves the covering 10 and embodiments discussed above. For instance, the base 11 and panels 12a-12d used in the method may incorporate the embodiments and alternatives discussed above. The method includes placing a pliable, liquid impermeable base 11 on a surface; moving the vehicle 100 onto the pliable base 11; adding padding material 21 to the at least one first base pocket 19 of the base 11; inserting a piece of protective material 31 into the at least one second base pocket 23 of the base; adding padding material 26 to the first panel pocket 24 of at least one of a front panel 12a, a back panel 12b, two opposing side panels 12c, and a top panel 12d of the plurality of panels 12; inserting a piece of protective material 30 into the second panel pocket 28 of at least one of the front panel 12a, the back panel 12b, the two opposing side panels 12c, and the top panel 12d of the plurality of panels 12; and connecting edges 14 of the panels 12 to form the enclosure 22 with the base 11 and completely enclose the vehicle 100 and seal the vehicle 100 within the enclosure 22.

In an embodiment of the method, at least one of the first base pocket 19 and the first panel pocket 24 is an inflatable pocket for containing a gas as the padding material 26, and the method includes inflating the at least one of the first base pocket 19 and the first panel pocket 24. The inflatable pocket 19, 24 may include an air valve 25 for inflating the inflatable pocket 19, 24, and the air valve 25 may extend from the inflatable pocket 19, 24 through the enclosure 22, so that the air valve 25 is exposed on the outer facing side 18 of one of the panels 12 or on the outer facing side 17 of one of the walls 13 of the base 11. The method may include inflating the at least one of the first base pocket 19 and the first panel pocket 24 via the air valve 25. Further, at least one of the second base pocket 23 and the second panel pocket 28 is closeable, and the method may include closing the at least one of the second base pocket 23 and the second panel pocket 28 to secure therein the first 30 or second piece of protective material 31.

Although several preferred embodiments have been illustrated in the accompanying drawings and describe in the foregoing specification, it will be understood by those of skill in the art that additional embodiments, modifications and alterations may be constructed from the principles disclosed herein.

What is claimed is:

1. A sealable covering for enclosing a vehicle in an interior thereof, comprising:
   a pliable, liquid impermeable base including walls, the walls including an inner facing side configured to face the interior of the base, and an outer facing side configured to face away from the interior of the base, wherein the inner facing side includes a first base pocket for containing padding material, one of the inner facing side and the outer facing side includes a second base pocket for receiving a first piece of protective material, and the first base pocket and the second base pocket overlap each other;
   a plurality of panels that are liquid impermeable and some of which that are either attached to the walls of the base or attachable to the walls of the base, wherein each of the panels includes at least one edge, an inner facing side configured to face the interior of the covering, and an outer facing side configured to face away from the interior of the covering; and
   a connector at the at least one edge of each panel for connecting the plurality of panels to form, with the base, an enclosure that completely encloses the vehicle and seals the vehicle within the covering, wherein
   the inner facing side of the panels includes a first panel pocket for containing padding material,
   one of the inner facing side of the panels and the outer facing side of the panels includes a second panel pocket for receiving a second piece of protective material,
   the first panel pocket and the second panel pocket overlap each other,
   the plurality of panels includes at least a front panel, a back panel, two opposing side panels, and a top panel that is configured to be provided over a top of the vehicle when the plurality of panels are connected together, and
   the plurality of panels together with the base form the enclosure when the plurality of panels are connected together.

2. The sealable covering for a vehicle according to claim 1, wherein the inner facing side of the walls includes the second base pocket for receiving the first piece of protective material.

3. The sealable covering for a vehicle according to claim 1, wherein the inner facing side of the panels includes the second panel pocket for receiving the second piece of protective material.

4. The sealable covering for a vehicle according to claim 1, wherein at least one of the second base pocket and the second panel pocket includes a pane of rigid material as the first piece of protective material or the second piece of protective material.

5. The sealable covering for a vehicle according to claim 4, wherein the pane of rigid material is plywood.

6. The sealable covering for a vehicle according to claim 4, wherein the second panel pocket substantially matches the size and the shape of the panel having the second panel pocket.

7. The sealable covering for a vehicle according to claim 4, wherein the pane of rigid material is provided in the second panel pocket, and substantially matches the size and the shape of the panel having the second panel pocket.

8. The sealable covering for a vehicle according to claim 1, wherein at least one of the first base pocket and the first panel pocket is an inflatable pocket for containing a gas as the padding material.

9. The sealable covering for a vehicle according to claim 8, wherein the inflatable pocket includes an air valve for inflating the inflatable pocket, the air valve extending from the inflatable pocket through the covering, so that the air valve is exposed on the outer facing side of one of the panels or on the outer facing side of one of the walls of the base.

10. The sealable covering for a vehicle according to claim 1, wherein an air bladder is provided in at least one of the first base pocket and the first panel pocket.

11. The sealable covering for a vehicle according to claim 1, wherein the connector is a water-tight zipper.

12. The sealable covering for a vehicle according to claim 1, wherein at least one of the second base pocket and the second panel pocket is closeable to secure therein the first or second piece of protective material.

13. The sealable covering for a vehicle according to claim 1, further comprising a flotation device for floating the enclosed vehicle on water.

14. The sealable covering for a vehicle according to claim 1, further comprising an anchor for securing the enclosed vehicle to a fixed object.

15. The sealable covering for a vehicle according to claim 1, further comprising a pump for pumping liquid inside the enclosure to outside the enclosure.

16. The sealable covering for a vehicle according to claim 1, further comprising a strap on the outer facing side of the base.

17. A method for sealing a vehicle inside an enclosure, comprising:

placing a pliable, liquid impermeable base on a surface, wherein the pliable base comprises:

walls includes an inner facing side configured to face the interior of the base, and an outer facing side configured to face away from the interior of the base, wherein the inner facing side includes a first base pocket for containing padding material, one of the inner facing side and the outer facing side includes a second base pocket for receiving a first piece of protective material, and the first base pocket and the second base pocket overlap each other, and a plurality of panels that are liquid impermeable and some of which that are either attached to the walls of the base or attachable to the walls of the base, wherein each of the panels includes an inner facing side configured to face the interior of the enclosure, and an outer facing side configured to face away from the interior of the enclosure; the inner facing side of the panels includes a first panel pocket for containing padding material, and one of the inner facing side and the outer facing side of the panels includes a second panel pocket for receiving a second piece of protective material, and the first panel pocket and the second pocket overlap each other, moving the vehicle onto the pliable base;

adding padding material to the at least one first base pocket;

inserting a piece of protective material into the at least one second base pocket;

adding padding material to the first panel pocket of at least one of a front panel, a back panel, two opposing side panels, and a top panel of the plurality of panels;

inserting a piece of protective material into the second panel pocket of at least one of the front panel, the back panel, the two opposing side panels, and the top panel of the plurality of panels; and connecting edges of the panels to form the enclosure with the base and completely enclose the vehicle and seal the vehicle within the enclosure.

18. The method according to claim 17, wherein at least one of the first base pocket and the first panel pocket is an inflatable pocket for containing a gas as the padding material, and the method includes inflating the at least one of the first base pocket and the first panel pocket.

19. The method according to claim 18, wherein the inflatable pocket includes an air valve for inflating the inflatable pocket, the air valve extending from the inflatable pocket through the enclosure, so that the air valve is exposed on the outer facing side of one of the panels or on the outer facing side of one of the walls of the base, and method includes inflating the at least one of the first base pocket and the first panel pocket via the air valve.

20. The method according to claim 18, wherein at least one of the second base pocket and the second panel pocket is closeable, and the method includes closing the at least one of the second base pocket and the second panel pocket to secure therein the first or second piece of protective material.

* * * * *